United States Patent Office 2,769,970
Patented Nov. 6, 1956

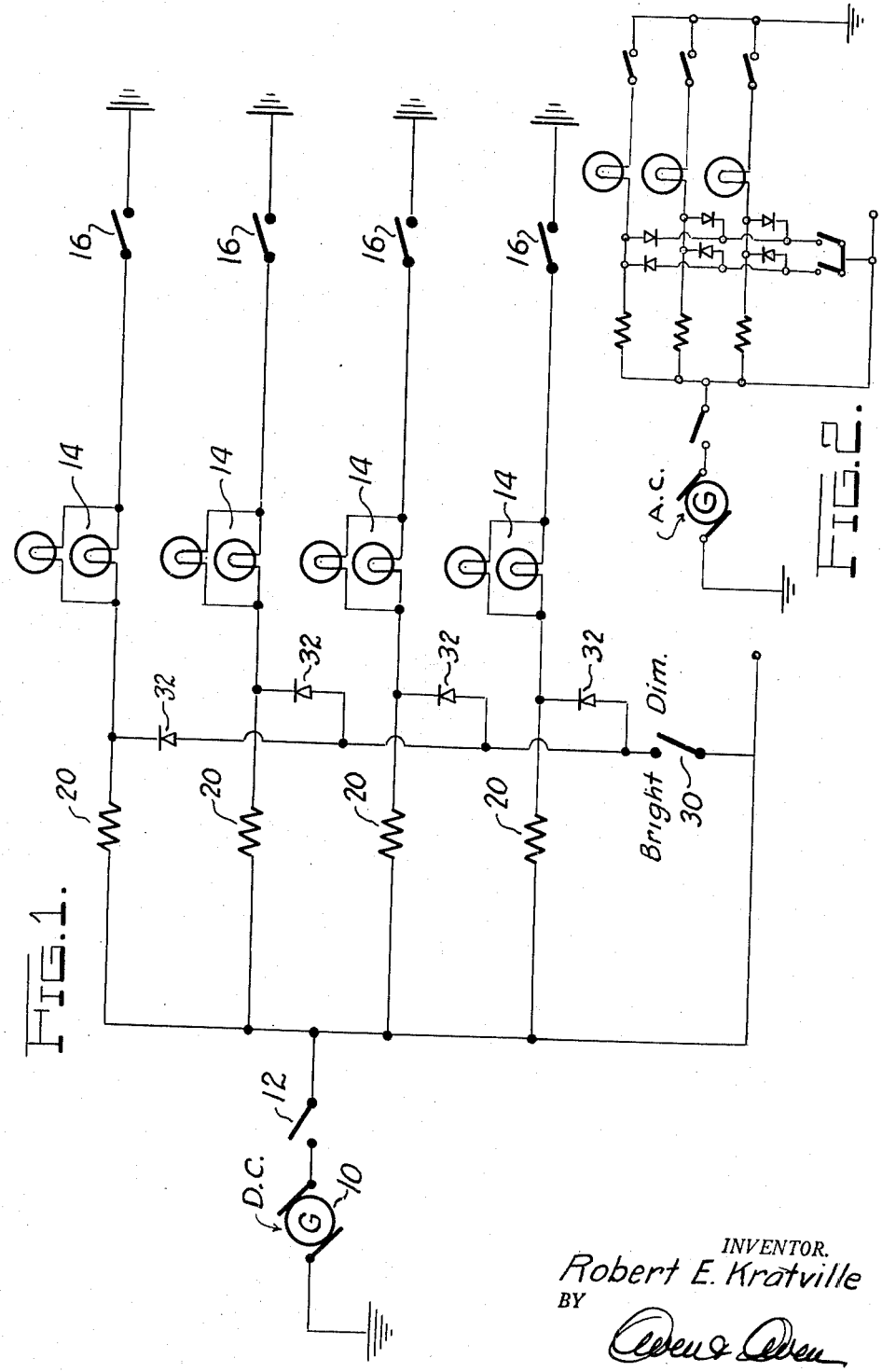

2,769,970
INDICATOR LAMP DIMMING CIRCUIT

Robert E. Kratville, Torrance, Calif., assignor to Theodore W. Hallerberg, Los Angeles, Calif.

Application February 9, 1956, Serial No. 564,556

2 Claims. (Cl. 340—213)

This invention relates to warning devices of the type used in aircraft and automotive vehicles and is particularly directed to a circuit used for regulating the intensity of the warning light displayed by such indicators.

It is the present practice in many aircraft and automotive vehicles to use indicating lights to warn the operator against the existence of an abnormality or unusual condition. Such devices are frequently used in groups with an individual light source for each member of the group. It has been found that if the warning light is of sufficient intensity to be noticed promptly under daylight conditions, it is so bright as to be annoying under night time conditions. Provision is usually made for dimming the lights at night, for this reason. At the present time the dimming mechanism is associated with each warning light, or else comprises a rheostat in series with the power source to reduce the voltage applied to the entire system.

Reduction of the system voltage is undesirable in aircraft systems for the reason that many of the components, such as relays and the like require full line voltage for their operation. The expedient of using a separately connectable dimming resistor for each lamp or light is cumbersome in that it requires so many adjustments by the operator. For example if there are forty warning lights in the group, he is required to throw forty switches, or in some systems to press inwardly on forty protruding lamp housings.

The present invention provides a simple and effective circuit which will permit simultaneous brightening and dimming of a great number of individual warning circuits with the use of one switch. The invention comprises a source of power of constant voltage, a dimming resistor in series with each indicating light and means to bypass or shunt each of the dimming resistors in such a manner that each of a group of indicating lights is separately shunted and cannot be affected by or cross fed to resistors in other of the light circuits.

The primary object of the invention is to provide a bright-dim circuit for a group of warning lights that is simple to construct and maintain and that is reliable in its operation.

Other objects and advantages of the invention will become apparent from the following detailed description of a preferred embodiment thereof, reference being had to the accompanying drawing in which—

Fig. 1 shows a simplified schematic wiring diagram of a direct current powered light indicator warning system embodying the invention; and Fig. 2 shows diagrammatically an alternating current powered system.

In the drawing 10 designates a power source which, by way of example, may generate a relatively constant twenty eight volts D. C. Such voltage is commonly used in aircraft indicating systems. A main switch 12 is provided immediately in series with the power source.

Stripped of all of its operating mechanism an indicating light circuit can be reduced to a warning light 14 in series with a normally open "function switch" 16. The function switch responds to the abnormality against which a warning is to be given. For example, it may be closed thermostatically if the temperature of a part of the aircraft rises beyond a predetermined value, or it may be closed by an actuating relay which, in turn, is responsive to the position of the landing wheels. Since these and similar function circuits form no part of the present invention they have been omitted from the drawing.

The warning light 14 preferably comprises two small lamps in parallel so that failure of one of them will not result in failure of the device to give a proper warning. Since lack of illumination is an indication of safety, use of a single lamp is considered to be unsafe for the reason that a burnt out lamp could mislead the operator into assuming that the guarded function was in normal condition when, in fact, it was not.

As previously noted, the intensity of the warning lights 14 when at full brilliance is made sufficient to alert the operator under daylight conditions. It has been found that this intensity causes annoying glare under night time conditions, so that provision is made to reduce the voltage to the warning lights at the will of the operator. Thus each of the parallel indicating circuits is shown as including a dimming resistor 20 in series with the respective warning light 14. The value of the resistor is chosen to comply with the applicable specification and usually results in dropping the voltage to the lamps to about one-half voltage or less.

The present invention comprises means to bypass or shunt all of said dimming resistors 20 in such a manner that each is still isolated in its own indicating circuit. A single switch 30 is connected to the power source and to a plurality of diodes 32, one for each indicating circuit. The diodes 32 are so connected that current can flow from the power source through switch 30 into the indicating circuit between the dimming resistor 20 and the associated warning light 14, but not in the opposite direction. Thus, with switch 30 closed, the warning lights 14 will glow at full brilliance whenever their associated function switches close, but with switch 30 open, current will flow to the lights only through the dimming resistor 20 and the display will be dimmed. The diodes 32 are of course connected to conduct in one direction or the other depending on the polarity of the source 10.

It will be apparent of course, that in the absence of the diodes 32, current for one of the indicating lights would flow not only through its own dimming resistor upon closure of its function switch, but through all of the other dimming resistors. Thus, an attempt simply to provide means to shunt out all of the resistors 20 at once would result in an indefinite degree of dimming which would not meet most specifications for warning lights of this character.

The disclosure so far has been directed to a circuit adapted for use with a direct current power source 10. The circuit can also be used with an alternating current source as shown in Fig. 2 by providing a duplicate set of diodes 32b connected however, to conduct in the opposite directions. Each set of diodes is preferably connected to a single throw double pole control or dimming switch 30b. The operation of the A. C. system is substantially the same as the D. C. system above described, and complete isolation of the several warning circuits is provided.

What I claim is:

1. In a warning system or the like comprising a power source, a plurality of parallel indicating circuits connected to said power source, each parallel circuit including a resistor, an indicating device and a function switch in series, the improvement comprising means to shunt the resistor in each of said parallel circuits including a diode connected between the resistor and indicating device and conducting in the direction of or away from said indicating device, depending on circuit polarity, and a single switch connected between said power source and all of said diodes in parallel, whereby closure of a function switch will cause only its associated indicating device to be connected to said power source through its connected diode and around its associated resistor when said single switch is closed.

2. In an alternating current warning system or the like comprising a power source, a plurality of parallel indicating circuits connected to said power source, each parallel circuit including a resistor, an indicating device and a function switch in series, the improvement comprising means to shunt the resistor in each of said parallel circuits including two diodes conducting in opposite directions and connected between the resistor and indicating device, and a single switch connected between said power source and all of said diodes in parallel, whereby closure of a function switch will cause only its associated indicating device to be connected to said power source through its connected diode and around its associated resistor when said single switch is closed.

References Cited in the file of this patent
UNITED STATES PATENTS 2,565,323   Quinn ---------------- Aug. 21, 1951